March 27, 1945.    R. W. MITCHELL    2,372,510
STRUCTURAL UNIT FOR AIRCRAFT AND THE LIKE
Filed March 22, 1943

Inventor:
Robert W. Mitchell,
By Dawson Ooms & Booth,
Attorneys.

Patented Mar. 27, 1945

2,372,510

UNITED STATES PATENT OFFICE 2,372,510

STRUCTURAL UNIT FOR AIRCRAFT AND THE LIKE

Robert W. Mitchell, Benton Harbor, Mich.

Application March 22, 1943, Serial No. 479,968

4 Claims. (Cl. 244—123)

This invention relates to structural units for aircraft and the like and more particularly to the construction of hollow airfoil section units such as the wings or control members of an airplane.

Units of this type have generally been constructed by building up a frame work of beams, trusses or the like, which form the principal load carrying members and covering the frame work with skin of sheet metal or similar sheet material. In forming units in this manner, there are a number of places where it is necessary to fasten the skin to the frame work which are accessible from only the outside of the unit so that blind riveting or some similar blind method of fastening must be resorted to.

One of the principal objects of the present invention is to provide a structural unit for aircraft or the like in which all fastenings are available from both sides during assembly so that no blind fastening is required.

Another object of the invention is to provide a structural unit for aircraft and the like in which a complete enclosed unit is formed without the necessity of a separate skin covering.

Still another object of the invention is to provide a structural unit for aircraft and the like which is formed of a series of channels whose flanges or extensions thereof are overlapped and secured together to form the outer skin of the unit.

The above and other objects and advantages of the invention will be more readily apparent from the following description when read in connection with the accompanying drawing, in which Figure 1 is a partial perspective with parts in section of a structural unit embodying the invention;

Figure 1:
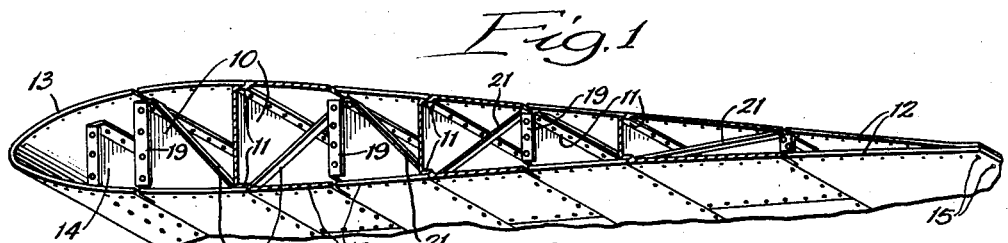
Figure 1A is a partial view similar to Figure 1 of a modified construction.
Figure 2:
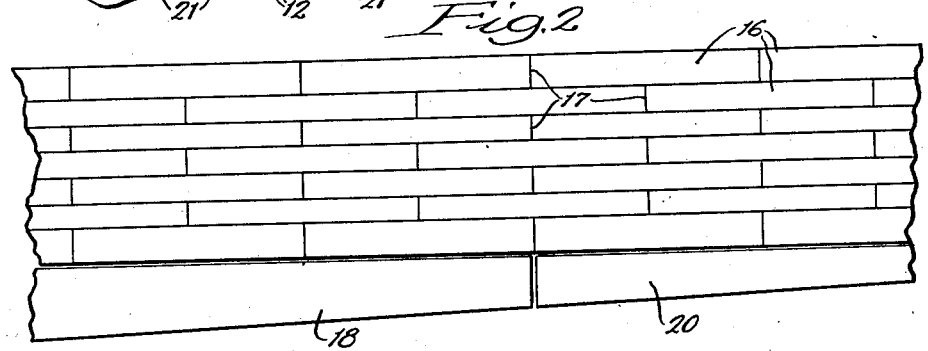
Figure 2 is a partial plan view of the unit of Figure 1.

The drawing illustrates the invention applied to the wing of an airplane but it will be understood that this use is only one example of the applications of the invention and is not to be taken as restrictive. In forming an airplane wing as shown in Figures 1 and 2, a plurality of channel members having webs 10 and outer flanges 11 are provided. The channel members may be of different sizes and the flanges may be shaped to provide a desired external contour as will be apparent.

The several channel members are assembled in parallel relationship with the webs extending longitudinally of the wing, that is, transverse to the line of flight, and with the open sides of the channels facing in the same direction. The flanges 11 are formed with extensions 12 shown as integrally connected to the flanges in Figure 1 and which extend from the flanges of one unit to overlap the flanges of the next adjacent unit. Preferably the extensions are offset outwardly from the flanges in an amount equal to the thickness of the material to provide recesses for reception of the edge of an adjacent extension. In this way, when the members are assembled, the unit will have a substantially smooth outer surface. The edges of the extensions are connected to the flanges which they overlap by lines of fastenings such as rivets, spot welds, seam welds or the like.

Figure 1A:
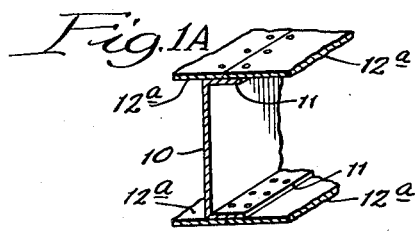

Instead of making the extensions integral as in Figure 1, they may be formed by separate flat plates 12A secured to and partially overlapping the flanges 11 as in Figure 1A to leave a recess for reception of the edge of the adjacent sheet.

The nose of the wing as shown in Figure 1 is formed by a nose strip 13 curved as desired and with its edges overlapping the flanges 11 of the first channel member. The nose may if necessary, be reinforced by a separate channel member 14 secured interiorly thereof, although in the case of relatively small units this reinforcement would probably not be necessary. The trailing edge of the wing may be formed by a small channel member whose outer edges are secured together by a line of fastenings indicated at 15 after it is assembled on the wing. If an aileron or like control surface is to be secured to the trailing edge of the wing, the extensions 12 of the rear-most channel member and possibly one or more complete channel members would be omitted to accommodate the width of the aileron and so that the aileron could be hinged to the last channel member.

In forming a long structural unit, such as a wing, the channel members are preferably made shorter than the full length of the unit so that each row of members across the wing includes several members connected together end to end. This construction is illustrated in Figure 2 in which each of the rows transversely of the wing includes a series of channel members 16. As shown in this figure, the members in adjacent rows are preferably staggered longitudinally so that the end joints 17 between the members in adjacent rows are staggered. This provides increased strength for the wing and does not interfere with the assembly operation. Figure 2 also illustrates a flap 18 and an aileron 20 mounted at the rear surface of the wing as explained above.

In order to secure the channel members together in end to end relationship in forming a unit of the type shown in Figure 2, the webs 10 are formed with end flanges 19 illustrated in Figure 1. The flanges 11 and extensions 12 of the channel members extend slightly beyond the end flanges 19 of the webs so that when two units are placed together end to end with their flanges 19 in abutting relation, the flanges 11 and extensions 12 will overlap and may be secured together.

In making up a unit according to the present invention, the nose piece 13 forms the starting point and the first channel member is assembled thereon leaving its rear edges open. Thus access may readily be obtained to both the exterior and interior surfaces of the flange 11 and the rear edge of the nose piece for riveting, welding or the like. The next channel member is then assembled on the rear open edges of the first channel member and is secured thereto, the operation continuing until the wing is completely assembled. With this construction it will be noted that no blind riveting or blind fastening of other types is required and that the channel members with the flange extensions 12 form the complete unit.

If it is desired to reinforce the structure against twisting stresses or the like, diagonal bracing is formed by flat strips 21 with their ends bent to overlie the flanges of adjacent channel members and extending diagonally between the webs of adjacent channel members. In inserting these strips it will be necessary to pierce openings in the flanges 11 to permit insertion of the ends of the strips between the flanges and the overlying extensions or if preferred, the ends of the braces may fit inside of the flanges so that no piercing is required. In any event, the braces may be secured in place during the assembly operation by the same fastening means which secures the extensions and flanges together.

Figure 3:
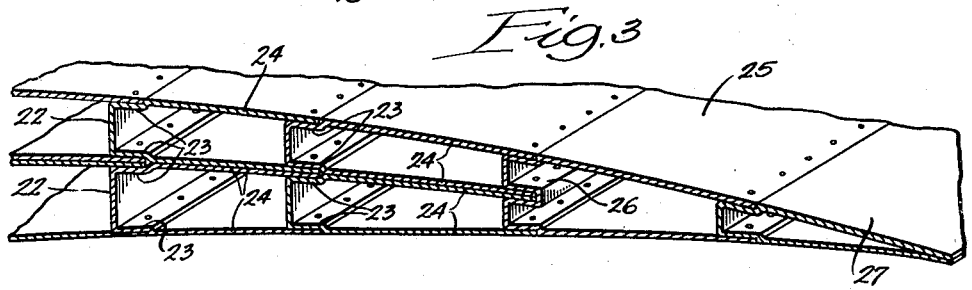
Figures 3 and 4 are views similar to Figure 1 of alternative constructions.

In the case of relatively large units such as larger wings it may be desired to provide central reinforcing means in the unit. A construction of this type is shown in Figure 3 in which the wing is made up of channels similar to those of Figure 1 having web portions 22, flanges 23 and integral offset extensions 24 on the flanges. In assembling these units two of the channel members are placed side by side with their webs 22 lying in the same plane and with their adjacent flanges lying face to face. The next pair of channel members is assembled with the edges of the outermost extensions 24 overlapping its outermost flanges 23 and with the intermediate extensions 24 lying between the intermediate flanges 23. The several parts are then secured together by riveting, welding or the like in the same manner as with the wing of Figure 1 so that when the assembly is completed the outermost extensions 24 form its outer skin and the intermediate flanges provide a central reinforcement extending through the wing.

As the wing tapers toward its smaller trailing edge, the central reinforcement may be omitted. In order properly to support and connect the intermediate flanges of the last double channel unit in the wing, a special channel member indicated at 25 is provided. This member is substantially identical with the single channel members of Figure 1 except that in its web a central grooved section 26 is provided to receive the rearward edges of the intermediate extensions of the preceding pair of channel members. The trailing edge section indicated at 27 may be the same as the trailing edge member of Figure 1.

Figure 4:
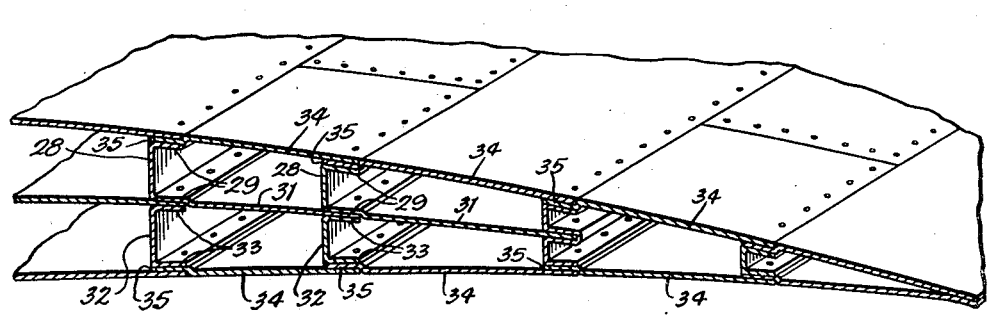

Instead of providing channels with extensions on all flanges as in Figure 3 which forms a double thickness reinforcing wall in the center of the wing, various other combinations may be used so that the center wall will be of only a single thickness. One such combination is shown in Figure 4 in which dis-similar channel members are employed. One of the channel members has a web 28 formed with flanges 29 only one of which has an integral extension 31. The other channel member includes only a web 32 and flanges 33 neither of which carries any integral extension. The integral extension 31 extends through the central portion of the wing as shown and is secured to the flanges of the adjacent pair of channel members by a joint in the center of the wing. The outer skin surfaces of the wing are formed by separate plates 34 having offset portions 35 substantially coextensive with the flanges to provide recesses for reception of the edges of adjacent plates. The plates 34 form extensions for the outermost flanges 29 and 33 and are secured thereto in assembling the wing by the same fastening units which secure the offset portions 35 to the rear edges of the adjacent plates. It will be understood that separate plates of this type could be employed in a single thickness wing as shown in Figure 1 if desired, and that various other combinations of extensions formed by separate plates or by integral flanges could be utilized in either a single or double thickness unit.

While several embodiments of the invention have been shown and described in detail, it will be understood that these are illustrative only and are not intended as a definition of the scope of the invention, reference being had for this purpose to the appended claims.

What is claimed is:

1. A hollow structural unit of substantially airfoil section for aircraft and the like comprising a series of channel members each having a web portion with outwardly extending flanges at its edges, the channel members being assembled in pairs lying side by side with their webs in the same plane and the pairs lying in parallel rows, extensions on the outermost flanges overlying and secured to the outermost flanges of adjacent pairs of members to form an outer skin for the unit, and an extension on at least one of the intermediate flanges of a pair overlapping and secured to the intermediate flanges of an adjacent pair to form a central reinforcement for the unit.

2. A hollow structural unit of substantially airfoil section for aircraft and the like comprising a series of channel members each having a web portion with outwardly extending flanges at its edges, the channel members being assembled in pairs lying side by side with their webs in the same plane and the pairs lying in parallel rows, a skin covering for the unit overlying and secured to the outer flanges of said channel members, and means forming a central reinforcing sheet for the unit connecting the intermediate flanges of the several pairs of channel members.

3. A hollow structural unit of substantially airfoil section for aircraft and the like comprising a series of channel members each having a web portion with outwardly extending flanges at its edges, the channel members being assembled in pairs lying side by side with their webs in the same plane and the pairs lying in parallel rows, a skin covering for the unit overlying and secured to the outer flanges of said channel members, and an extension on at least one of the intermediate flanges of each pair overlapping and secured to the intermediate flanges of an adjacent pair to form a central reinforcing sheet for the unit.

4. A hollow wing structure of substantially airfoil section comprising a series of elongated structural members assembled in pairs, said members having web portions and inner and outer flange portions, the web portions of each pair together spanning the wing structure and the intermediate flange portions of each pair lying opposite each other in the central portion of the wing, a skin covering for the wing overlying and secured to the outer flange portions of the members, and means forming a central reinforcing sheet connecting the intermediate flange portions of the several pairs of members.

ROBERT W. MITCHELL.